United States Patent
Bensmann et al.

(10) Patent No.: US 11,286,034 B2
(45) Date of Patent: Mar. 29, 2022

(54) LEADING-EDGE SLAT FOR AN AIRCRAFT

(71) Applicant: Airbus Operations GmbH, Hamburg (DE)

(72) Inventors: Stefan Bensmann, Hamburg (DE); Marcus Erban, Hamburg (DE); Martin Fees, Hamburg (DE)

(73) Assignee: Airbus Operations GmbH

( * ) Notice: Subject to any disclaimer, the term of this patent is extended or adjusted under 35 U.S.C. 154(b) by 232 days.

(21) Appl. No.: 16/674,162

(22) Filed: Nov. 5, 2019

(65) Prior Publication Data

US 2020/0164961 A1    May 28, 2020

(30) Foreign Application Priority Data

Nov. 22, 2018  (DE) ..................... 10 2018 129 455.7

(51) Int. Cl.
*B64C 9/24* (2006.01)
*B64C 3/18* (2006.01)
(Continued)

(52) U.S. Cl.
CPC ................ *B64C 9/24* (2013.01); *B64C 3/185* (2013.01); *B64D 15/04* (2013.01); *B64D 33/02* (2013.01);
(Continued)

(58) Field of Classification Search
CPC .. B64C 9/24; B64C 3/185; B64C 9/08; B64C 3/26; B64C 3/50; B64C 3/28; B64D 15/04; B64D 33/02; B64D 33/04; B64D 27/18; B64D 2033/0233; B64D 2033/0286; B64D 15/02; Y02T 50/40
See application file for complete search history.

(56) References Cited

U.S. PATENT DOCUMENTS

| 3,917,193 A | * | 11/1975 | Runnels, Jr. ............ B64C 21/04 244/207 |
| 3,933,327 A | * | 1/1976 | Cook ...................... B64D 15/04 244/134 B |

(Continued)

FOREIGN PATENT DOCUMENTS

| CN | 205440885 | * | 8/2016 | ............. B64D 15/04 |
| CN | 205440885 U | | 8/2016 | |

(Continued)

OTHER PUBLICATIONS

CN205440885_Description_English_Translation (Year: 2016).*

(Continued)

*Primary Examiner* — Assres H Woldemaryam
(74) *Attorney, Agent, or Firm* — Lerner, David, Littenberg, Krumholz & Mentlik, LLP

(57) ABSTRACT

A leading-edge slat for an aircraft is proposed, which includes a front skin), a back skin, a spar and an air inlet for receiving air at an elevated temperature for de-icing or anti-icing. In the slat, at least one air chamber is created, which is supplied with said air. A first portion of the back skin is attached to the spar at a distance to the bottom section, wherein a second portion of the back skin is attached to the top section. Thereby, a region in front of the fixed leading edge is created, into which air from air outlets integrated into the back skin can be exhausted outside of the slat.

15 Claims, 3 Drawing Sheets

(51) Int. Cl.
  *B64D 15/04* (2006.01)
  *B64D 33/02* (2006.01)
  *B64D 33/04* (2006.01)
  *B64D 27/18* (2006.01)

(52) U.S. Cl.
  CPC .............. *B64D 33/04* (2013.01); *B64D 27/18* (2013.01); *B64D 2033/0233* (2013.01); *B64D 2033/0286* (2013.01)

(56) References Cited

U.S. PATENT DOCUMENTS

| | | | | |
|---|---|---|---|---|
| 4,285,482 | A * | 8/1981 | Lewis | B64C 21/04 |
| | | | | 244/207 |
| 4,752,049 | A * | 6/1988 | Cole | B64D 15/04 |
| | | | | 244/134 B |
| 7,249,735 | B2 * | 7/2007 | Amorosi | B64C 9/22 |
| | | | | 244/214 |
| 9,896,190 | B1 * | 2/2018 | Amorosi | B64C 21/02 |
| 10,086,923 | B2 * | 10/2018 | Seack | B64C 1/064 |
| 2001/0023909 | A1 | 9/2001 | Laugt | |
| 2011/0248122 | A1 * | 10/2011 | Schlipf | B64C 3/50 |
| | | | | 244/214 |
| 2012/0187254 | A1 * | 7/2012 | Wollaston | B64C 9/22 |
| | | | | 244/214 |
| 2014/0339358 | A1 * | 11/2014 | Swartley | F16C 23/041 |
| | | | | 244/99.3 |
| 2017/0174313 | A1 * | 6/2017 | Brakes | B64C 3/28 |
| 2017/0369147 | A1 * | 12/2017 | Wong | B64C 21/02 |
| 2018/0170557 | A1 * | 6/2018 | Lorenz | B64C 21/04 |
| 2019/0359341 | A1 * | 11/2019 | Meis | B64D 15/20 |
| 2021/0237850 | A1 * | 8/2021 | Turner | B64C 9/08 |

FOREIGN PATENT DOCUMENTS

EP       0230684 A1   8/1987
WO    2018005529 A1   1/2018

OTHER PUBLICATIONS

Extended European Search Report for Application No. 19210693.8 dated Jan. 31, 2020, 11 pages.

German Search Report for Application No. 102018129455.7 dated Aug. 13, 2019, 7 pages.

* cited by examiner

LEADING-EDGE SLAT FOR AN AIRCRAFT

FIELD OF THE INVENTION

The invention relates to a leading-edge slat for an aircraft, a wing having a movable leading-edge slat as well as an aircraft.

BACKGROUND OF THE INVENTION

In commercial aircraft, the icing of wing components and control surfaces is often prevented by using deicing or anti-icing devices. A common approach to achieve this is to heat up respective parts with bleed air from turbofan engines. The deicing of slats may be complicated, since most of a slat body needs to be heated, even though an internal structure of the slat is often separated by a spar. Introducing the air with an elevated temperature heats up the slat but requires an exhaust of the bleed air from the slat body. As a back skin of a leading-edge slat typically follows the shape of a fixed leading edge of the wing, air that exits from the slat impinges the fixed leading edge. Hence, additional measure for protecting the fixed leading edge are required.

Alternative solutions, such as proposed in DE 10 2008 019 146 A1, include the use of air, which is heated by a component of an environmental control system, to the device to be protected from icing. In DE 10 2004 058 430 B4 it is proposed to use exhaust air from a fuel cell also for the purpose of icing protection. However, the temperature level may be lower than in a bleed air based system.

BRIEF SUMMARY OF THE INVENTION

Aspects of the invention may provide a leading-edge slat, which allows to be heated through air at an elevated temperature, in particular through bleed air, while adverse effects to a fixed leading edge shall be avoided as much as possible.

A leading-edge slat for an aircraft is proposed, the leading-edge slat comprising a slat body having a front skin, a back skin, a spar and an air inlet, wherein the front skin is curved about at least 120° around a spanwise axis to form a bottom section and a top section, wherein a leading edge of the slat body is arranged between the bottom section and the top section, and wherein the spar extends from the bottom section to the top section, wherein a first portion of the back skin is attached to the spar at a distance to the bottom section, wherein a second portion of the back skin is attached to the top section and wherein the back skin is bent away from the spar and comprises a directly adjacent outlet portion that extends in a spanwise direction and directly faces the bottom section, wherein the front skin, the back skin and the spar enclose at least one air chamber that is in fluid communication with the air inlet, and wherein the outlet portion comprises a plurality of air outlets for letting air from the at least one air chamber flow exhaust through the air outlets.

Thus, the overall design of the leading-edge slat clearly differs from a common design. The front skin is a part of the leading-edge slat that faces into the airflow, which impinges onto the leading-edge slat during flight. The front skin is strongly curved and comprises the leading edge, which may be located in the direct vicinity of the stagnation point. The front skin may be manufactured from a single, sheet-like material, such as a sheet of metal or a fiber-reinforced laminate. It may have a constant height or a variable height, depending on the respective design philosophy. The cross section of the front skin may somewhat resemble a U-shape, wherein both legs of the U-shape are considered the bottom section and the top section. In between, near a region of the strongest curvature, the leading edge may be arranged. For providing dimensional stability, a plurality of ribs may be distributed along the leading-edge slat. The front skin is the part of the leading-edge region of a wing that is visible during cruise flight.

The spar is used for providing a mechanical stability. The spar may exemplarily be aligned in such a way, that it extends substantially parallel to a Z axis of the aircraft when the leading-edge slat is installed on a wing and is in a retracted position. The spar may comprise flanges that are joined to the bottom section as well as the top section. Depending on the material used for manufacturing the slat body, the spar may also be based on a sheet-like material, which may comprise cutouts for weight reduction.

The air inlet may be arranged at a lateral side of the leading-edge slat and allows to supply air at an elevated temperature into the at least one air chamber. The outlet openings are in fluid communication with the at least one air chamber, such that air that enters the at least one air chamber is capable of exiting the same through the outlet openings. It may be beneficial to dimension the outlet openings in a way that a slight pressure builds up inside the slat body. Further, the outlet openings may be distributed substantially along the whole region of interest to be protected from icing. This allows to distribute the air inside the leading-edge slat. In case of multiple air chambers inside the slat body care should be taken in allowing a flow through all air chambers by providing certain cross-flow openings.

According to an embodiment of the invention, instead of attaching the back skin directly to the front skin, at least a first portion of the back skin is attached to the spar at a distance to the bottom section. Hence, the space between the back skin and the bottom section is supplemented by a part of the spar to provide a closed contour. This allows to provide an outlet portion with an orientation that significantly differs from the spar and the remaining part of the back skin. This dedicated outlet portion allows to integrate several optimized air outlets. These are capable of letting air flow out of the slat body in an outward direction, without impinging the fixed leading edge that is arranged directly adjacent to the back skin. The air does not flow directly onto the fixed leading edge. Thus, the fixed leading edge does not necessarily have to be protected from the flow of hot air.

In an advantageous embodiment the outlet portion is substantially flat. Thus, the design of the back skin for integrating the air outlets is very simple. In a manufacturing process, the alignment and size of the outlet portion can easily be adjusted as desired. It may be beneficial to let the air outlets extend through the outlet portion perpendicularly, such that the air flow is perpendicular to the outlet portion. Thus, the air flow direction depends on the alignment of the outlet portion. By providing a suitably sized and positioned outlet portion and by placing the air outlets at suitable locations of the outlet portion, the flow direction can easily be adjusted.

In a further advantageous embodiment, each of the air outlets are designed to comprise a through-flow direction axis, wherein the through-flow direction axis and the spar enclose an angle of 45° at a maximum. If the available space behind the spar is not sufficient for providing an outlet portion that is perpendicular to the spar or if this is not required, also a certain maximum angle between the spar and a flow direction axis is tolerable. The maximum angle may differ between actual aircraft models and it may also be less than 45°, for example 25°, 20°, 15° or even less. Altogether, it is substantial to provide an exhaust air flow that does not directly impinge the fixed leading edge. It is preferred that the exhaust air flow always maintains at least a slight distance to the fixed leading edge.

In a further advantageous embodiment, the outlet portion is connected to a central portion of the spar, wherein the central portion extends in a range of 20 percent above and 45 percent below the half-height of the spar. Consequently, the outlet portion is substantially arranged at the half-height of the spar, which allows an orientation of the outlet portion that clearly differs from a tangent of the fixed leading edge.

The first portion may be designed as a flange surface. Consequently, the back skin comprises a flange, which may simply be provided in the form of an elongated, stripe shaped surface, which is arranged at an angle to the outlet portion. Such a flange can be attached to the spar by gluing, co-consolidation, riveting or screwing, depending on the material of the spar and the back skin. However, such a design supports manufacturing the slat body from a fiber reinforced material.

The first portion may extend along the spar towards the bottom section. Consequently, a part of the back skin in the form of the first portion is attached to the spar and follows the shape of the spar. A first air chamber is created between the spar and the front skin, while in addition a second air chamber is created between the back skin and the spar. Consequently, an attachment of the back skin by the first portion is outside both air chambers at the outside of the slat body.

The back skin may be bent away from the spar through a kink. Using a kink allows a narrower design of the back skin with the integrated outlet portion, which may follow almost directly after the spar. In case of a constraint space behind the spar this may be a beneficial solution to maximize the size of the outlet portion.

However, the back skin may also be bent away from the spar through a curved transition section. Such a transition section has a less abrupt directional change of the back skin and may be advisable if a fiber reinforced material is used. The forces to be transferred in this transition section can change their directions without any significant load peaks.

It is preferred that the curved transition section comprises a constant radius of curvature. In doing so, the transition section allows a very moronic transfer of forces.

The back skin may be bent towards the front skin at a region directly adjacent to the outlet portion opposite to the spar. Consequently, the outlet portion is then arranged between two bent regions. In a section between the outlet portion and the second portion, the back skin may comprise the same shape as a conventional back skin in the same section. However, under consideration of the above explanation, approximately at the half-height of the spar the conventional shape of the back skin is interrupted and bridged by the outlet portion that extends to the spar. Thus, a clear and compactly defined region is created, where air is exhausted.

The invention further relates to a wing for an aircraft, having a fixed leading edge and a leading-edge slat according to the above description. The leading-edge slat is movable between a retracted position directly forward the fixed leading edge and at least one extended position at a further distance to the fixed leading edge. Such a wing preferably belongs to a commercial aircraft that travels in the transonic velocity range. For enhancing the flight at low velocities during approach and landing, the leading-edge slat according to the above description is provided to the wing. By allowing to introduce air at an elevated temperature into at least one air chamber of the slat body, de-icing or anti-icing can be achieved.

The air outlets may be designed to exhaust the air in a region in front of the fixed leading edge in the retracted position of the leading-edge slat. Consequently, the air having an elevated temperature flows out of the at least one air chamber into a region in front of the fixed leading edge so as to avoid impinging on the fixed leading edge. As stated above, only a slight tangential flow at a maximum is desired.

The invention further relates to an aircraft having at least one such wing, wherein the air inlet is in fluid communication with a source of heated air. Said source of heated air may include many devices that are capable of providing this function.

For example, the aircraft may further comprise at least one turbofan engine having at least one bleed air port, wherein the air inlet is in fluid communication with the at least one bleed air port, such that bleed air delivered by the at least one turbofan engine is the source of heated air. It may be preferred that the heated air has a temperature of approximately 100° C. at a maximum.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
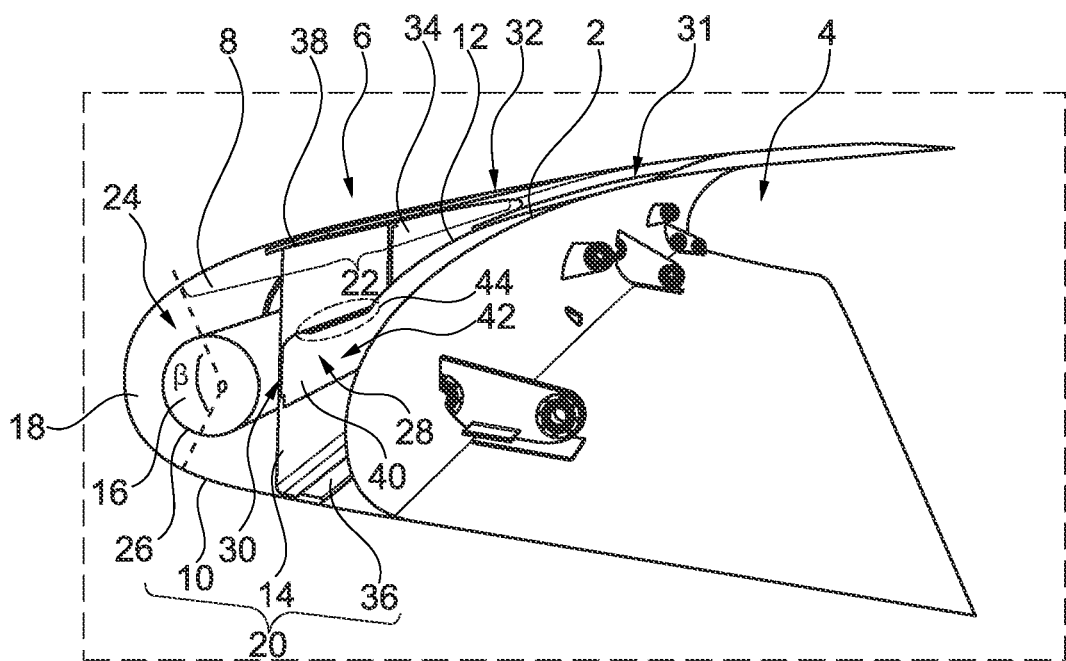
FIG. 1 shows a leading-edge slat and a fixed leading edge of a wing in a sectional view.

FIG. 1 shows a fixed leading edge 2 of a wing 4 and a leading-edge slat 6 in front of the fixed leading edge 2. In this illustration, the leading-edge slat 6 is in its retracted position. During certain flight phases, the leading-edge slat 6 can be moved to extended positions in a larger distance to the fixed leading edge 2. The leading-edge slat 6 comprises a slat body 8 having a front skin 10, a back skin 12, a spar 14 and an air inlet 16. The front skin 10 is significantly curved about an angle β of approximately 150° as an example and constitutes a forward delimitation of the wing 4 if the leading-edge slat is in the retracted position. In a region of strongest curvature, a leading edge 18 is located. During flight, the front skin 10 is exposed to an air flow.

The front skin 10 forms a bottom section 20 and a top section 22, wherein the leading edge 18 is arranged therebetween. The spar 14 extends from the bottom section 20 to the top section 22. Consequently, a first air chamber 24 is created between the spar 14 and the front skin 10. Here, a tube 26, which may be a piccolo tube, extends along the leading edge 18. The piccolo tube is a tube having a plurality of openings in its circumferential surface. Air from an interior space of the piccolo tube can be discharged through the openings to the outside of the piccolo tube. Hence, air at an elevated temperature can be supplied into the tube 26 through the air inlet 16, such that it flows through the tube 26 into the first air chamber 24. As a result, the front skin 10 is heated up for conducting a de-icing or anti-icing function.

The back skin 12 comprises a first portion 28, which is attached to the spar 14. Exemplarily, the first portion 28 is arranged in a central portion 30 of the spar 14. From there, the back skin 12 exemplarily extends to an upper end 32 of the front skin 10 to form a second portion 31, which is exemplarily attached to the front skin 10. Thus, a second air chamber 34 is created between the back skin 12, the front skin 10 and the spar 14.

For attaching the spar 14 it comprises a lower flange 36, as well as an upper flange 38. In the first portion 28, the back skin 12 comprises an attachment flange 40, with which it is attached to the spar 14. In FIG. 1 it is clearly apparent that between the fixed leading edge 2, the spar 14 and the back skin 12 an open region 42 is present. As an upper delimitation of the open region 42, the back skin 12 comprises an outlet portion 44, which is further depicted in FIG. 2.

Figure 2:
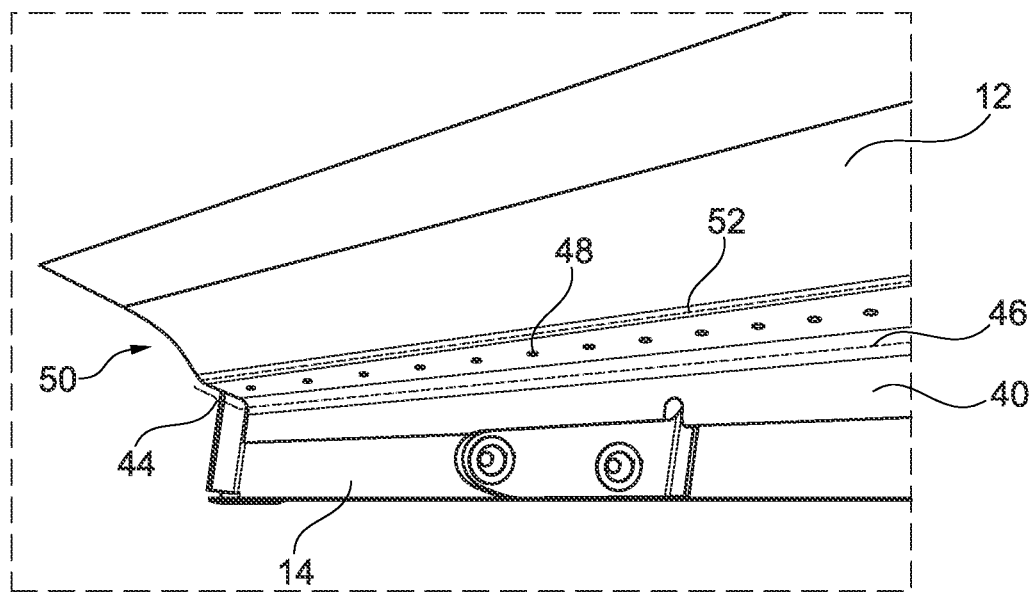
FIG. 2 shows the leading-edge slat from a rear view.

FIG. 2 shows the spar 14 and the back skin 12 from another viewing direction. Here, it is clearly apparent that the back skin 12 is bent away from the spar 14 through a kink 46, wherein the outlet portion 44 is directly adjacent. The outlet portion 44 comprises a number of air outlets 48, through which air from the second chamber 34 can be exhausted. The outlet portion 44 is arranged in such a way that air exiting the second air chamber 34 flows in a direction that directly faces the bottom section 20. In the exemplary embodiment of FIG. 1, the outlet portion 44 is substantially flat, which allows to precisely determine the direction of flow of the air outlets 48.

In addition, the back skin 12 is bent towards the front skin 10 at a region 50 directly adjacent to the outlet portion 44 opposite to the spar 14. In this example, this is conducted by a further kink 52, such that the outlet portion 44 is enclosed by two substantially parallel kinks 46 and 52.

Figure 3:
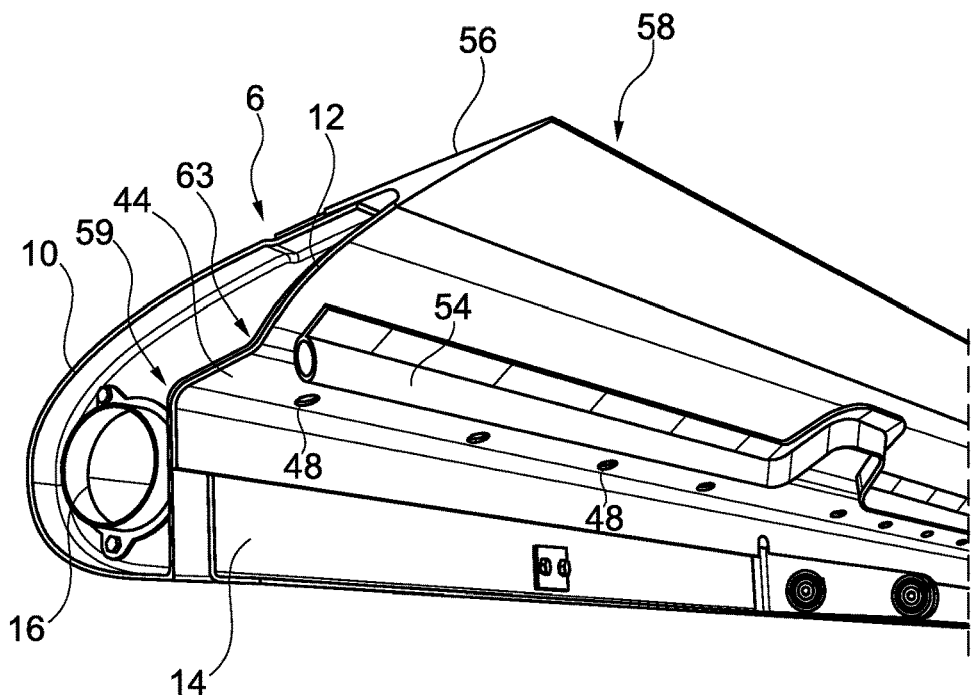
FIG. 3 shows a slightly modified leading-edge slat in a three-dimensional view.

FIG. 3 shows a further illustration of the leading-edge slat 6 from a still further viewing direction. Here, a sealing device 54 is shown, which is arranged adjacent to the outlet portion 44 at a side opposite to the spar 14. The sealing device 54 allows to seal the space enclosed by the outlet portion 44, the spar 14 and the fixed leading edge 2, such that air that is exhausted from the second chamber 34 enters the open region 42 and exits into the surroundings of the aircraft afterwards.

It is further apparent that the front skin 10 and the back skin 12 may be connected to a trailing edge device 56, which may be made from another material or by using a different manufacturing process. Hence, neither the front skin 10 nor the back skin 12 necessarily need to extend to an outer trailing edge 58 of the leading-edge slat 6.

Figure 4:
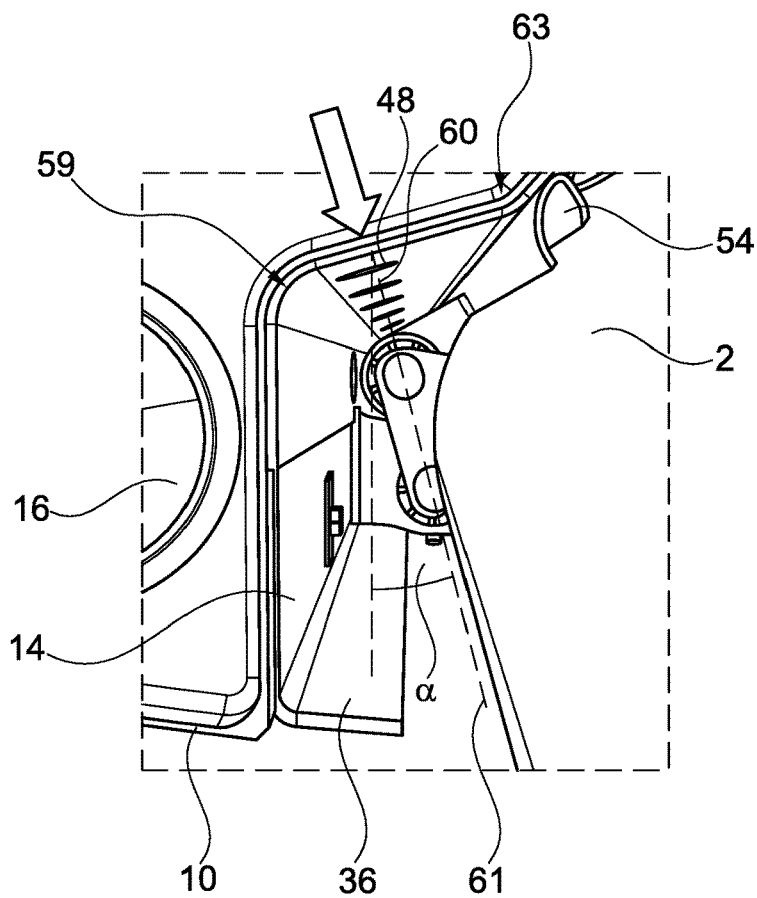
FIG. 4 shows a detail of an open region between the leading-edge slat and the fixed leading edge in a lateral view.

In FIG. 4 the flow direction of exhaust air 60 is shown from a lateral viewing direction. It is clearly apparent that the exhaust air 60 does not directly impinge the fixed leading edge 2. As a maximum, the exhaust air 60 flows tangentially along or just in front of the fixed leading edge 2. Each of the air outlets 48 is designed to comprise a through-flow direction axis 61. The spar 14 and the through-flow direction axis 61 enclose an angle α of approximately 15°. It may be advantageous to limit this angle α to 45° at a maximum in various designs, while in the exemplary embodiment it may be feasible to limit this angle to 20°, given the design of the fixed leading edge 2, the spar 14 and the outlet portion 44.

In this illustration it is also apparent that the outlet portion 44 is bent away from the spar 14 through a curved transition section 59. Exemplarily, the transition section 59 has a constant radius of curvature, such that the shape and orientation of the attachment flange 40 in the first portion 28 is harmonically changing to the outlet portion 44. Stress or load peaks are thereby avoided. As an example, a similar transition section 63 is arranged at the opposed side of the outlet portion 44. A curved transition is a preferably option, if fiber-reinforced materials are used.

Figure 5:
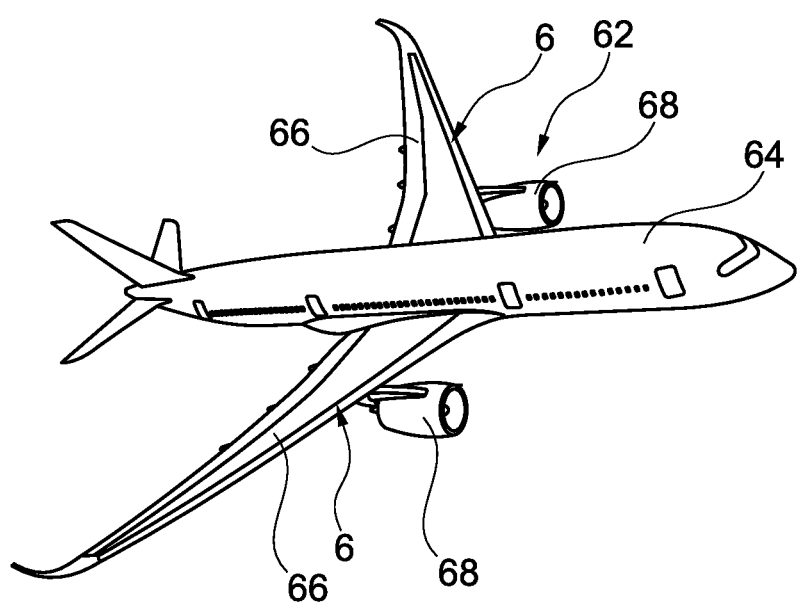
FIG. 5 shows an aircraft.

Finally, FIG. 5 shows an aircraft 62, having a fuselage 64, wings 66 and turbofan engines 68, wherein the wings 66 are equipped with the leading-edge slats 6 explained above. The air inlets 16 of the leading-edge slats 6 may be supplied with bleed air taken from the turbofan engines 68.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 fixed leading edge
4 wing
6 leading-edge slat
8 slat body
10 front skin
12 back skin
14 spar
16 air inlet
18 leading edge
20 bottom section
22 top section
24 first air chamber
26 tube
28 first portion
30 central portion
31 second portion
32 upper end
34 second air chamber
36 lower flange
38 upper flange
40 attachment flange
42 open region
44 outlet portion
46 kink
48 air outlet
50 region 52 kink
54 sealing device
56 trailing edge device
58 trailing edge
59 transition section
60 exhaust air
61 through-flow direction axis
62 aircraft
63 transition section
64 fuselage
66 wing
68 turbofan engine
α angle between spar and through-flow direction axis

The invention claimed is:

1. An aircraft leading-edge slat, comprising:
a slat body having a front skin;
a back skin;
a spar; and
an air inlet,
wherein the front skin is curved about at least 120° around a spanwise axis to form a bottom section and a top section, wherein a leading edge of the slat body is arranged between the bottom section and the top section, and wherein the spar extends from the bottom section to the top section,
wherein a first portion of the back skin is attached to the spar at a distance to the bottom section, wherein a second portion of the back skin is attached to the top section, wherein the back skin is bent away from the spar and comprises a directly adjacent outlet portion extending in a spanwise direction and directly facing the bottom section,
wherein the front skin, the back skin and the spar enclose at least one air chamber in fluid communication with the air inlet, and
wherein the outlet portion comprises a plurality of air outlets for letting air from the at least one air chamber exhaust through the air outlets.

2. The aircraft leading-edge slat of claim 1, wherein the outlet portion is substantially flat.

3. The aircraft leading-edge slat of claim 1, wherein each of the air outlets are configured to comprise a through-flow direction axis, wherein the through-flow direction axis and the spar enclose an angle of 45° at a maximum.

4. The aircraft leading-edge slat of claim 1, wherein the outlet portion is connected to a central portion of the spar, and
wherein the central portion extends in a range of 20 percent above and 45 percent below the half height of the spar.

5. The aircraft leading-edge slat of claim 1, wherein the first portion is configured as a flange surface.

6. The aircraft leading-edge slat of claim 5, wherein the first portion extends along the spar towards the bottom section.

7. The aircraft leading-edge slat of claim 1, wherein the back skin is bent away from the spar through a kink.

8. The aircraft leading-edge slat of claim 1, wherein the back skin is bent away from the spar through a curved transition section.

9. The aircraft leading-edge slat of claim 8, wherein the curved transition section comprises a constant radius of curvature.

10. The aircraft leading-edge slat of claim 1, wherein the back skin is bent towards the front skin at a region directly adjacent to the outlet portion opposite to the spar.

11. An aircraft wing, having a fixed leading edge and a leading-edge slat according to claim 1, wherein the leading-edge slat is movable between a retracted position directly forward the fixed leading edge and at least one extended position at a further distance to the fixed leading edge.

12. The aircraft wing of claim 11, wherein the air outlets are configured to exhaust the air in a region in front of the fixed leading edge in the retracted position of the leading-edge slat.

13. The aircraft wing of claim 11, wherein the air outlets are arranged in front of the fixed leading edge.

14. An aircraft having at least one aircraft wing of claim 11, wherein the air inlet is in fluid communication with a source of heated air.

15. The aircraft of claim 14, further comprising at least one turbofan engine having at least one bleed air port, wherein the air inlet is in fluid communication with the at least one bleed air port, such that bleed air delivered by the at least one turbofan engine is the source of heated air.

* * * * *